United States Patent
Wang et al.

(10) Patent No.: US 8,774,872 B2
(45) Date of Patent: Jul. 8, 2014

(54) METHODS AND DEVICES FOR PROVIDING A RING SIGNAL TO A CALLED PARTY TERMINAL

(75) Inventors: Lansheng Wang, Beijing (CN); Chao Li, Beijing (CN); Ying Yan, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 281 days.

(21) Appl. No.: 13/061,393

(22) PCT Filed: Sep. 2, 2008

(86) PCT No.: PCT/CN2008/001564
§ 371 (c)(1),
(2), (4) Date: Apr. 7, 2011

(87) PCT Pub. No.: WO2010/025579
PCT Pub. Date: Mar. 11, 2010

(65) Prior Publication Data
US 2011/0312390 A1      Dec. 22, 2011

(51) Int. Cl.
*H04M 1/00* (2006.01)
(52) U.S. Cl.
USPC .......................................... 455/567; 379/252
(58) Field of Classification Search
USPC .......................................... 455/567; 379/252
See application file for complete search history.

(56) References Cited

U.S. PATENT DOCUMENTS

| | | | |
|---|---|---|---|
| 6,650,746 | B1 | 11/2003 | Groen et al. |
| 2002/0196914 | A1 | 12/2002 | Ruckart |
| 2003/0202651 | A1* | 10/2003 | Nguyen et al. ............ 379/373.02 |
| 2004/0053624 | A1* | 3/2004 | Frank et al. .................... 455/453 |
| 2004/0081305 | A1* | 4/2004 | Gonzalez et al. ......... 379/207.16 |
| 2006/0215827 | A1* | 9/2006 | Pfleging et al. .......... 379/142.02 |
| 2008/0095078 | A1* | 4/2008 | Benco et al. .................. 370/259 |
| 2009/0185670 | A1* | 7/2009 | Staples ........................ 379/252 |
| 2010/0002861 | A1* | 1/2010 | Gao et al. ................. 379/207.16 |

FOREIGN PATENT DOCUMENTS

| | | |
|---|---|---|
| CN | 1758687 A | 4/2006 |
| CN | 1787575 A | 6/2006 |
| CN | 1859480 A | 11/2006 |

* cited by examiner

*Primary Examiner* — Kiet Doan
*Assistant Examiner* — Mazda Sabouri
(74) *Attorney, Agent, or Firm* — Coats & Bennett, P.L.L.C.

(57) ABSTRACT

Methods and devices for providing a ring signal to a called party terminal (450, 550, 650, 750, 124, 134) for a call from a calling party terminal (400, 500, 600, 700, 120, 130) to the called party terminal for alerting the called party regarding the call from the calling party. A communication network node (420, 520, 620, 720, 122, 132, D90) receives (S100) an indication of an attempt for the call and sends (S110) a ring signal specified by the calling party at a service node (430, 530, 630, 730, 125, 135, D100) of a calling party ring signal service to the called party terminal for alerting the called party regarding the call from the calling party.

14 Claims, 7 Drawing Sheets

METHODS AND DEVICES FOR PROVIDING A RING SIGNAL TO A CALLED PARTY TERMINAL

TECHNICAL FIELD

The present invention relates to communication, in particular to methods and devices for providing a ring signal to a called party terminal for a call from a calling party terminal to the called party terminal for alerting the called party regarding the call from the calling party.

BACKGROUND

When making a phone call from a calling party terminal to a called party terminal, the called party is alerted of the incoming call by a ring signal while the calling party hears a ring back signal until the call is answered or terminated. A called party and a calling party are typically human beings also known as users operating a respective device like a stationary or mobile phone or stationary or laptop computer. A ring signal is any kind of signal for alerting the called party about an incoming call. Examples for ring signals are ring tones, multimedia clips, optical signals, recorded speech, announcements, or vibration sequences that can be output at the called party terminal, e.g. via a loudspeaker, screen display, Light Emitting Diodes (LEDs), vibration mechanics etc.

For the ring signal output to the called party, current typical implementation is that ring signals are stored in the called party terminal and the called party can select the ring signal to be played during the alerting period. The called party has the possibility to assign different calling party phone numbers to different ring signals and to store these relations in the called party's terminal. When an incoming call is received and the received phone number of the calling party matches to one of the stored phone numbers, the corresponding ring signal is output.

For the ring back signal played to the calling party terminal, it is possible that the ring back signal can be either generated by the calling party terminal itself or received from the network. If the ring back signal is received from the network it can be either the default ring back signal stored in a network node or a ring back signal specified by the called party. The latter service is also known as "Personalized Ring Back Tone (PRBT)". The PRBT service enables the calling party to specify a ring tone that is played-back at call-attempt to the calling party.

Hence, many call procedures exist wherein a party can specify its own ring signal for improved information or entertainment purpose. However, little is known about procedures wherein a calling party can specify a ring signal to be output at a called party terminal for alerting the called party regarding the call from the calling party.

CN 1859480 A describes a method and system for providing a ring signal called multiple color alerting tone (CAT) to a called party. A user having the future role of a calling party or a called party can subscribe to a CAT service by sending from a terminal CAT instructions to a Session Initiation Protocol (SIP)-based softswitch server. The terminal can be a web terminal, an interactive communication terminal or an interactive voice responder device. For the subscription, the softswitch server indicates to the user to select a ring signal and to input a called party or a calling party number, and/or groups. At the terminal, a ring signal, a called party or a calling party number and/or group numbers are selected and the selected ring signal and numbers are sent from the terminal to the softswitch server which records the submitted subscription information.

When the calling party makes a call from a calling party terminal to a called party terminal of a called party via the softswitch server, the softswitch server checks if the CAT service is subscribed. If the check is in the affirmative, the softswitch server sends a CAT request to a media server and a CAT request to a called party terminal to establish a connection between each other and then to send a ring signal from the media server to the called party terminal.

The softswitch server in CN 1859480 A may control the sending of the request to the media server as well the sending of the request to the called party terminal, however, the softswitch server does not control the sending of the ring signal from the media server to the called party terminal. The softswitch server does not control which ring signal is actually sent and at what time exactly. Hence, it may occur that an incorrect ring signal is sent or that the timing of the sending of the ring signal from the media server to the called party terminal does not match to further processes or message exchanges performed at call attempt time which may lead to unsuccessful call attempts and poor user satisfaction. Furthermore, not every called party terminal is capable of establishing two connections, i.e. one for the delivery of the ring signal and one for the call attempt.

SUMMARY

It is therefore an object of the invention to provide methods, devices, and computer programs that provide a ring signal to a called party terminal for a call from a calling party terminal to the called party terminal for alerting the called party regarding the call from the calling party, wherein one or more of the aforementioned shortcomings are overcome or at least mitigated.

This object is achieved by the independent claims. Advantageous embodiments are described in the dependent claims.

According to a first aspect, a method for providing a ring signal to a called party terminal for a call from a calling party terminal to the called party terminal for alerting the called party regarding the call from the calling party is provided. A communication network node receives an indication of an attempt for the call and sends a ring signal specified by the calling party at a service node of a calling party ring signal service to the called party terminal for alerting the called party regarding the call from the calling party.

According to a second aspect, a method for providing a ring signal to a called party terminal for a call from a calling party terminal to the called party terminal for alerting the called party regarding the call from the calling party is provided. A service node of a calling party ring signal service receives a request from a communication network node for a ring signal for alerting the called party regarding the call from the calling party. Furthermore, the service node obtains a ring signal specified by the calling party at the calling party ring signal service and sends the obtained ring signal to the communication network node.

According to a third aspect, a method for providing a ring signal to a called party terminal for a call from a calling party terminal to the called party terminal for alerting the called party regarding the call from the calling party is provided. A terminal for the calling party obtains one or more instructions for specifying a ring signal to be used for alerting the called party regarding a call from the calling party and sends the one or more instructions to a service node of a calling party ring signal service for specifying the ring signal by the calling party.

In the following, detailed embodiments of the present invention shall be described in order to give the skilled person a full and complete understanding. However, these embodiments are illustrative and not intended to be limiting.

DETAILED DESCRIPTION

Figure 1:
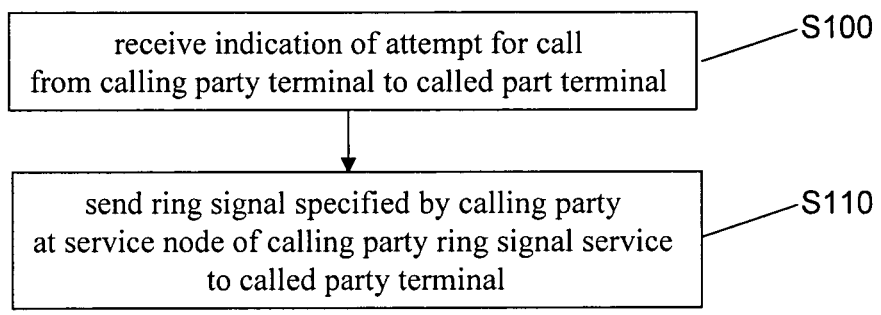
FIG. 1 shows an example for a flow chart of steps performed at a communication network node.

FIG. 1 shows an example for a flow chart of steps performed at a communication network node controlling the calling party ring signal service. A communication network node may be a switching node such as e.g. a mobile service switching center (MSC) or gateway MSC (GMSC) as explained in more detail in conjunction with FIG. 4-7.

The communication network node receives S100 an indication of an attempt for the call from the calling party terminal to the called part terminal, The communication network node further sends S110 a ring signal specified by the calling party at a service node of a calling party ring signal service to the called party terminal for alerting the called party regarding the call from the calling party.

Specification of the ring signal may be performed e.g. when subscribing to the service or in case of subscription updating (i.e. for any future calls) or call-by-call for a current call attempt. Information regarding the calling party user's specification at the service node of the calling party ring signal may be available to the communication network node, e.g. by receiving the specified ring signal or an identifier thereof from the service node or from subscription information available to the communication network node. Alternatively or in addition, information for specifying the ring signal for a particular call may be received at the time of the call attempt, e.g. in form of an instruction (e.g. sequence number) referring to a particular ring signal for the current call as will explained as well as further embodiments referring to the specification of a ring signal by the calling party in more detail below.

The communication network node may be actively involved in the call attempt procedure for the call from the calling party terminal to the called party terminal, e.g. it may control the call set-up or be otherwise involved in processes performed at and messages exchange at call attempt time. The communication network node can further control the timing of the sending of the ring signal. A control of the timing may relate to an initiation of the sending as well as duration or end of the sending. A communication network node via which a call attempt from a calling party terminal to a called party terminal is made can further align (due to its inherent control or active involvement) the timing of the sending of the ring signal with further steps related to the call attempt which may increase accuracy and user perception.

The communication network node may further select an appropriate communication network path for the sending of the ring signal and a further appropriate communication network path for the sending and/or receiving of further information related to the call-attempt to the called party terminal, e.g. the same path that is used for call attempt may be used also for ring signal sending. Hence, control about a selection of communication network paths can be resource efficient. Furthermore, characteristics of the path for ring signal sending may be selected (optimized) by the communication network node typically also controlling the call attempt to the called party terminal, e.g. bearer characteristics may be selected according to characteristics of the ring signal (e.g. a multimedia-capable bearer may be established for a multimedia clip as ring signal whereas a speech bearer may be established for voice-based ring signal etc.).

As the ring signal is sent from the communication network node, the communication network node may intercept the ring signal for immediate verification or may record it to be verified at a later time.

The communication network node may have received a ring signal specified by the calling party at a service node of a calling party ring signal service in advance to the call, e.g. from the service node itself or from or via any other node that is capable of providing the ring signal to the communication network node according to the specification at the service node. The received ring signal may be stored at least temporarily by the communication network node in an own database as a ring signal specified by the calling party, and when an indication for a call by the calling party is received at the communication network node, the communication network node may retrieve the stored ring signal from the database and send it to the called party terminal for alerting the called party about the incoming call. Still another example comprises a communication network node receiving information from the service node that the communication network node can choose a ring signal on behalf of the calling party (random selection may be an option for a specification for a ring signal by the calling party).

According to an embodiment, the communication network node may send, in response to the received indication, a request for a ring signal to the service node of the calling party ring signal service. The ring signal can then be received from the service node. Separating the administration of the ring signal from call attempt functionality hosted at the service node and the communication network node, respectively, can be of advantage as communication network nodes that are involved in call-set-up or call-control are specifically designed for such tasks but not for administrating data such as ring signals specified by a calling party.

According to a further embodiment, the service node plays the ring signal while sending to the communication network node which relays the received played ring signal for the sending of the ring signal to the called party terminal. Separating the play-out functionality (e.g. streaming) from the sending functionality (e.g. forwarding) eases the implementation as in most communication networks communication network nodes that are involved in call-set-up or call-control are specifically designed for such tasks but often not for playing media. Hence, the play-out functionality is preferably anchored in the service node and not in the communication network node for this kind of service. The communication network node may receive the played ring signal in a data stream that is just to be forwarded by the communication network node for the sending. Alternatively, the communication network node may convert the received played ring signal to a format that is best suited for the sending to and/or outputting at the called party terminal, probably considering play-out capabilities of the called party terminal and capabilities of the interconnecting communication network path to the called party terminal.

According to an embodiment, the communication network node may send a notification message to the called party terminal for informing the called party terminal about the sending of the ring signal. The notification message may indicate to the called party terminal to prepare for the reception of the ring signal, e.g. to provide necessary resources at a receiving, processing, and outputting unit for alerting the called party user about the incoming call with the calling party specified ring signal. As an example, for illustration, the notification message may instruct the called party terminal to attach to a user plane for reception of the ring signal which can be then received, processed, and output accordingly.

Typically, called party terminals are provided with a default ring signal that is activated and output for alerting the called party user about the incoming call. A default ring signal may be received from the network or stored at the called party terminal, possibly associated with various calling party numbers. However, parallel or sequential output of the default ring signal and the ring signal specified by the calling party is detrimental to the called party user perception. Accordingly, the communication network node may send out a message to suppress a default ring signal at the called party terminal which in turn can thus suppress the default ring signal for the call and only plays the ring signal specified by the calling party for alerting the called party about the incoming call from the calling party terminal. The message for suppressing may be (at least part of) the notification message or a separate message.

However, there might be legacy called party terminals that are not adapted to process a received message for suppressing the default ring signal accordingly and measures are needed to improve user perception to which a parallel or sequential output of a default and a calling party specified ring signal can be clearly detrimental.

A called party terminal, especially, a legacy terminal, may not be adapted to process a message indicating a suppressing accordingly, e.g. may discard the message and starts playing the default ring signal instead for alerting the called party user. According to a further embodiment, the ring signal may be sent by the communication network node immediately after reception of information that the called party terminal starts or is about to start outputting its default ring signal. Hence, the ring signal can be sent at the point in time when the called party terminal starts alerting or is about to alert such that the ring signal is received at the called party terminal (quasi-)coincident with the start of output of the default ring signal which is overridden by the received ring signal. Consequently, an alerting by a default ring signal is not perceived by the called party user.

According to a further embodiment, the communication network node receives information that the service node is ready to send the ring signal. The communication network node further controls a timing of an initiation of an access to the called party terminal after reception of the information that the service node is ready to send the ring signal, sends an indication for requesting the service node to immediately send the ring signal, and immediately after the reception of the ring signal from the service node, the communication network node sends the received ring signal (e.g. relays a played ring signal) to the called party terminal. According to this embodiment, the timing of the output of the ring signal at the called party terminal can be further optimized as it can be aligned with further processes and messages at call attempt time. For example, for a call to a wireless called party terminal such as a mobile phone or a laptop computer with wireless radio access capabilities, the communication network node can control a timing of an initiation of a radio access to the called party terminal after reception of the information that the service node is ready to send the ring signal. Accordingly, the radio access (e.g. radio resource allocation, radio bearer selection and set-up) can be timed in a way such that the output of any default ring signal can be activated quasi-simultaneous with the immediately requested and sent ring signal specified by the calling party that preferably overrides the default ring signal for this particular call. Hence, any time difference between any default alerting and alerting by the specified ring signal can be minimized such that only the specified ring signal is perceived by the called party user as explained in more detail in conjunction with the example of FIG. 5. A matching of timing of the sending of the ring signal to the output of a default ring signal (which is typically activated by a message from the communication network to the called party terminal) and to the usual steps performed for call attempt can minimize the probability that the ring signal is sent out too early or too late in relation to the starting of a default ring signal. In other words, a too early sending may interfere with the usual steps performed at call attempt and the sent ring signal may not be received and output at the called party terminal (or at least not the beginning) or the call attempt may be terminated because of the too early sending to which the communication network and/or the called party may not be adapted to. If the ring signal is sent too late, the default ring signal outputting may have already started and the called party user may be irritated by the subsequent output of the sent ring signal which concerns user perception and even user security due to the irritation.

According to a further embodiment, the communication network node checks if any of the calling party and the called party has a subscription to a ring back signal service. A ring back signal service is similar to a PRBT service, i.e. a personalized ring back signal can be sent to the calling party at call attempt time. If this check is in the affirmative, the communication network node selects a first communication network path for a sending of a ring back signal to the calling party terminal. The first communication network path is separate from a second communication network path for the sending of the ring signal to the called party terminal. The communication network node further sends the ring back signal via the first communication network path to the calling party terminal and sends the ring signal via the second communication network path to the called party terminal. The second communication network path is preferably the same communication network path as the communication network path via which information related to the attempt is sent.

The communication network node may be further adapted to send to the service node information for specifying the ring signal for the call that is (currently) attempted, i.e. for specifying the ring signal for the current call. Based on the provided information, the ring signal can be obtained by the service node for the current call. Alternatively or in addition, the communication network node may send to the service node information for specifying the ring signal for a future call, e.g. to set a ring signal profile at the service node. The information for specifying the ring signal can be e.g. obtained from one or more instructions received from the calling party terminal and/or from further information suited for specifying the ring signal received from further entities (e.g. radio access network (RAN), home subscriber server (HSS), and/or called party terminal) of the communication network, e.g. an identity for identifying the calling party at the service node may be derived by the communication network node from an International Mobile Subscriber Identity (IMSI) or calling party number or the like. Furthermore, control over the calling party ring signal service can be improved as the finally obtained and sent ring signal can be selected by the service node in accordance with the received information and instructions, e.g. a ring signal may be obtained that matches characteristics/preferences of the calling party, the called party, and/or the called party terminal.

Typically, a service node administers more than one ring signal specified by more than one calling party to be provided to more than one called party terminal with probably having different processing and output capabilities for a ring signal. Hence, from information that is related to the calling party or type of calling party, the service node can obtain a ring signal that is associated to the calling party or type of calling party. The same applies for information relating to the called party or type of called party. Considering already within the process of obtaining the called party terminal or characteristics of the called party terminal may provide that a ring signal can be selected that matches to the processing and output characteristics of the called party terminal. In other words, the probability of a selection of a ring signal that is not suited for outputting at the called party terminal can thus be minimized. From information indicating a particular ring signal, a particular ring signal specified by the calling party can be obtained, e.g. for a particular (current) call, such that the calling party ring signal service can be executed in a more spontaneous and direct manner, i.e. a calling party may enter an identifier (e.g. nick name or sequence number) of a particular ring signal when making a call to called party. The identifier is then sent via the communication network node to the service node which can obtain the ring signal associated to the received identifier for the alerting of the called party for this particular call accordingly.

According to a further embodiment, the communication network node verifies that the calling party has a subscription to the calling party ring signal service. In case the calling party has a not valid subscription, the sending of the ring signal can be prohibited right away by the communication network node. Especially, if the procedure is configured such that the communication network node has to request the ring signal from a service node of the calling party ring signal service, the sending out of the request can be skipped right away such saving messaging and processing effort, not only at the communication network node but also at the service node.

According to a further embodiment, the communication network node may check if the called party is associated with a preference setting regarding the calling party ring signal service and proceed accordingly. For example, the called party may have specified (e.g. with a so-called white list as preference setting) that only certain calling party numbers are allowed or may have specified (e.g. with a so-called black list as preference setting) that certain calling party numbers are not allowed. For an allowed calling party number, the calling party specified ring signal can be provided to the called party terminal, for a non-allowed calling party number the service can be suppressed for this call right away and the default ring signal may be activated, thus saving ring signal related communication and processing effort at all entitles involved in case the called party user does not wish to receive a calling ring signal as specified by a particular calling party.

Figure 2:
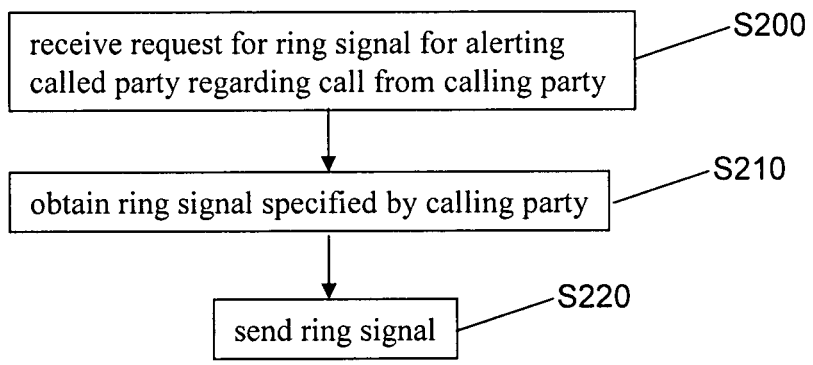
FIG. 2 shows an example for a flow chart of steps performed at a service node of a calling party ring signal service.

FIG. 2 shows an example for a flow chart of steps performed at a service node of a calling party ring signal service, e.g. a "calling party personalized ring tone" (CPPRT) server of a CPPRT service as illustrated in and described in conjunction with FIG. 4-7. The service node receives S200 a request from a communication network node for a ring signal for alerting the called party regarding the call from the calling party. The service node obtains S210 a ring signal specified by the calling party at the calling party ring signal service. The ring signal may be stored in a database and retrieved for the obtaining. Alternatively, the ring signal may be freshly generated for the obtaining, e.g. by a live recording of a TV or radio event or by a random sequence of signals if such specified by the calling party. After the obtaining, the service node sends S220 the ring signal to the communication network node which can thus stay in control over the calling party ring signal service.

The ring signal that is sent can be an indication of a ring signal such that the communication network node may obtain the ring signal corresponding to the identifier from an own database or request it from another node of the communication network. Alternatively, the ring signal that is sent can be e.g. a file containing content. According to a preferred embodiment, the service node can administrate the ring signal (s) specified by the calling party at the calling party ring signal service and a ring signal specified by the calling party can be sent from the service node to the communication network node in response to the request for a ring signal for the called party.

According to an embodiment, the ring signal can be played while the sending, e.g. the service node may be adapted to stream a data file as the ring signal to the communication network node.

According to a further embodiment, the service node sends information indicating a readiness to send the ring signal. It immediately sends the ring signal after reception of an indication for requesting the service node to immediately send the ring signal. Hence, the communication network node as well as further instances of the communication network can prepare itself for the sending. Consequently, the sending of the ring signal can be executed end-to-end from the service node via the communication network node to the called party terminal as the relevant entities are ready for sending. Hence, time alignment can be improved between the communication network and the service node as well to the called party terminal.

According to an embodiment, the service node may receive from the communication network node information for specifying the ring signal for the call that is attempted, i.e. for the current call attempt. The service node can then obtain the ring signal for the (current) call based on the received information.

According to a further embodiment, the service node may receive for a future call from the communication network node information for specifying the ring signal. Alternatively or in addition, the service node may receive from a terminal for the calling party and/or the calling party terminal one or more instructions for specifying the ring signal. The service node records the received information and/or the one or more received instructions and can obtain the ring signal based on the recorded information and/or the one or more recorded instructions.

The service node may associate one or more ring signals with information derived from received information/instruction(s) for the specification by the calling party at the calling party ring signal service. An association of information to a ring signal that reflects a specification of at least one ring signal by the calling party is referred to "ring signal profile" in the following. Said information and association(s) may be set by one or more instructions by the calling party for the specification.

The service node can be configured to receive one or more instructions from a terminal (which can be the calling party terminal or a separate terminal) for the calling party for setting a ring signal profile for the ring signal specification at the calling party ring signal service. From the ring signal profile, an appropriate ring signal may be obtained according to the information received from the communication network node at call attempt.

In other words, a ring signal profile may associate at least one ring signal with at least one of one or more identifiers for identifying at least one particular ring signal, information relating to a calling party, information relating to a type of a calling party, information relating to a called party, information relating to a type of a called party, information relating to a called party terminal, information relating to a characteristic of a called party terminal, and timing information. Said information in the profile may be set via instructions as described before and in more detail in conjunction with FIG. 13.

| Calling Party ID | Ring signal | Called Party ID | Sequence Number |
|---|---|---|---|
| A1 | F100 | — | — |
| B1 | F100 | — | 123 |
| B1 | F200 | A2 | 124 |
| B1 | F300 | B2, D2, E2 | 125 |

The table above serves to illustrate possible ring signal profiles for a calling party with calling party identifier A1 and a further calling party with calling party identifier B1 (note a calling party user may have more than one calling party ID; a calling party identifier may be a party phone number or IP address or the like). For A1, only the ring signal F100 is associated and no specifications are made regarding the called party identifier and the sequence number, i.e. for any call F100 is the default ring signal specified by the calling party with calling party ID A1 at the service node of the calling party ring signal service. For B1, ring signals F100, F200, and F300 are associated. F200 is to be used for a called party with called party identifier A2 and F300 for called parties with called party identifiers B2, D2, E2 while F100 is the default specified ring signal for any other called party. F100, F200, and F300 have further associated sequence numbers 123, 124, and 125, respectively. By dialing a sequence number in addition to the called party number when making a call to a called party, the calling party can specify call-by-call a particular ring signal that is to be sent to the calling party. In other words, the calling party enters the sequence number and the called party number in the calling party terminal. The communication network node receives the sequence number and forwards the sequence number and the calling party number to the service node which then can obtain the corresponding ring signal from the ring signal profile associating the ring signal with the calling party number and the sequence number. The obtained ring signal is then sent via the communication network node for outputting at the called party terminal for this particular call. The sequence number serves as an example for an identifier for a particular ring signal. Another example is a nick name for a particular ring signal assigned by the calling party.

Further information may be associated to a ring signal specified by the calling party for a better specification, e.g. timing information such as day, day time etc such that different ring signals may be obtained for different times (e.g. at night time a more calm ring signal may be more appropriate than at day time where a louder and more spectacular ring signal may be better perceived by the calling party user). The service node may determine the day and time e.g. from an internal calendar and clock, checks if the ring signal(s) specified by the calling party are associated with timing information (e.g. weekend evening) that prescribe to select a certain ring signal to be obtained.

Another example may relate to a type of a called party, e.g. if a business contact is called as called party number, then a more formal ring signal may be desired by the calling party user compared to a called party being calling party's best friend. Hence, the ring signal profile may comprise information regarding the type of called party such as BUSINESS, FAMILY, FRIENDS etc. When making a call, the calling party terminal may be adapted to check in its address book if the dialed number is associated with a certain called party type information and then sends this type information to the communication network node which then forwards this type information to the service node which can select the appropriate ring signal based on an analysis of the received type information. Alternatively, the calling party user may enter a certain called party type code as an instruction into the calling party terminal when making the call to a called party, e.g. for a call-by-call called party type specific ring signal specification similar as described for the embodiment referring to call-by-call specification of particular ring signals by sequence numbers.

Figure 3:
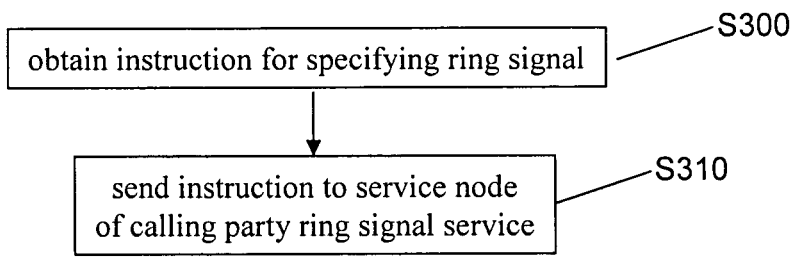
FIG. 3 shows an example for a flow chart of steps performed at a terminal for a calling party.

FIG. 3 shows an example for a flow chart of steps performed at a terminal for a calling party. The terminal for the calling party obtains S300 one or more instructions for specifying a ring signal to be used for alerting the called party regarding a call from the calling party. The one or more instructions may be received at the terminal via an input unit operated by the calling party user for inputting the one or more instructions. Alternatively or in addition, the terminal may generate instructions based on stored information, e.g. as described for type information of the called party as explained above. The terminal sends S310 the one or more instructions to a service node of a calling party ring signal service for specifying the ring signal by the calling party. The one or more instructions may be sent directly or via the communication network node as described in more detail in conjunction with the embodiment of FIG. 13.

A terminal for a calling party and a calling party terminal are typically the same device, e.g. one and the same mobile phone, but not necessarily. For example, a calling party terminal may be a mobile phone while a terminal for the calling party may be a computer with a web access to a web page of the calling party ring signal service which can be more convenient to operate because of larger screen and keyboard. Access to the service node via a terminal for a calling party is very useful for any modifications that the calling party user wants to make for e.g. updating ring signals or associations to party identifiers etc. and can thus be preferred over possible alternative implementations wherein the calling party user has not the possibility for terminal access to the calling party ring signal service specification. Such an alternative for specifying the ring signal at the calling party ring signal service maybe via the initial subscription to the calling party ring signal service where the calling party subscriber gets one or more ring signals assigned to be used as calling party ring signal(s) for any call made later on. The subscription agreement may encompass regular updates of the one or ring signals, but the user experience may be greater and more immediate and direct if the calling party user can specify the ring signal and associated information directly via the terminal by entering and sending appropriate instructions.

According to an embodiment, the one or more instructions are sent for specifying the ring signal for a future call. Alternatively or in addition, the terminal for the calling party may be the calling party terminal and the one or more instructions are sent in conjunction with an attempt for the call (i.e. the current call) to the communication network node for the sending of the one or more instructions to the service node.

In the following FIGS. 4-7 various examples for implementation of a calling party ring signal service in a mobile circuit switched network are described in detail. The service is called CPRRT (Calling Party Personalized Ring Tone) in these examples without—however—be limited to ring tones but applicable to any kind of ring signal.

Figure 4:
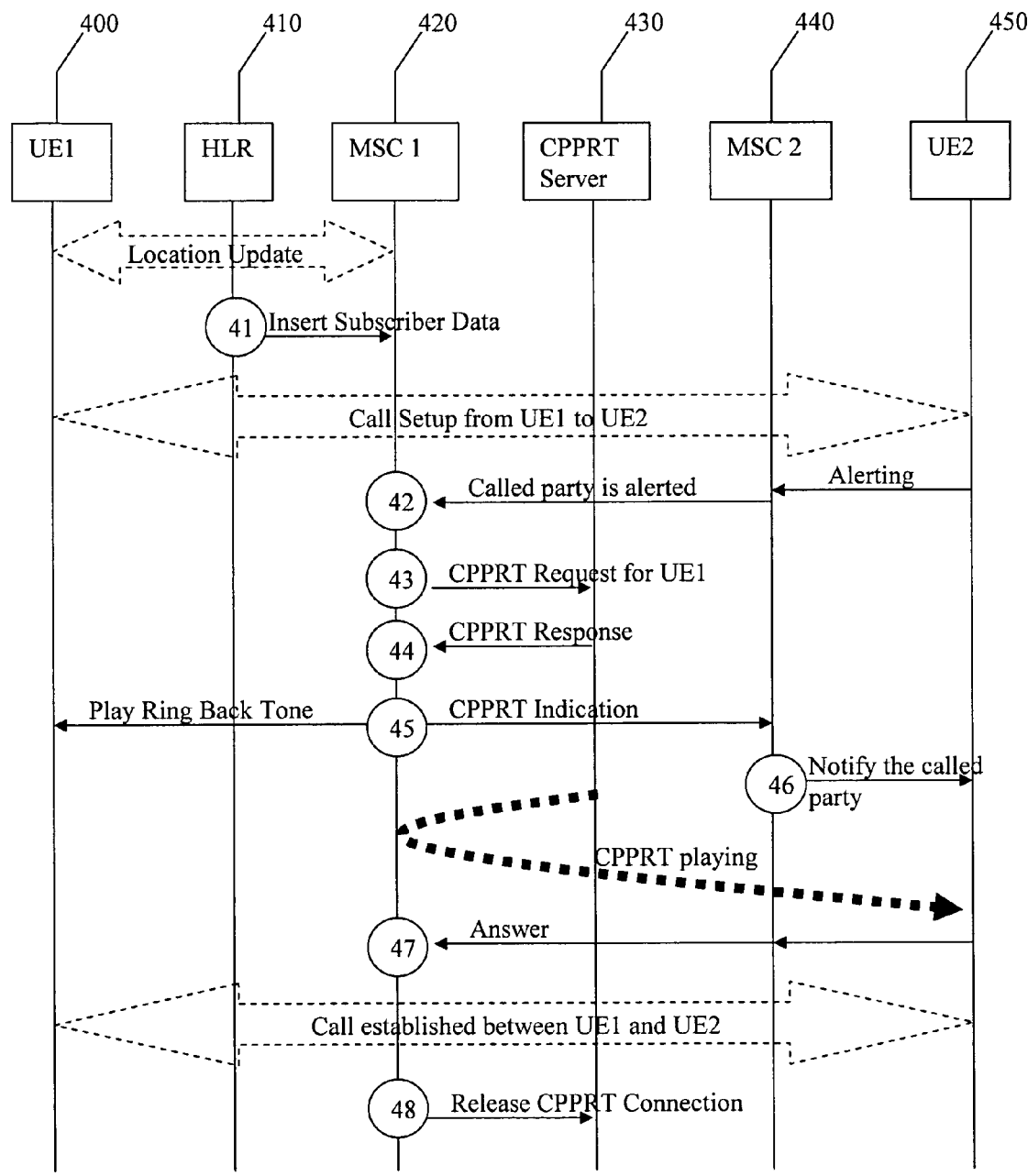
FIG. 4 shows a first schematic signaling diagram in a communication network implementing a calling party ring signal service.

FIG. 4 shows a schematic overview of CPRRT system. Only the main procedures related to implementation of CPPRT are illustrated while other normal call processing procedures are not shown in FIG. 4 for illustrative reasons.

The system comprises a Home Location Register (HLR) 410 which stores the CPPRT subscription information of the calling party, a first mobile service switching center (MSC1) 420 as an example for a communication network node controlling the CPPRT procedure during call processing and a CPPRT Server 430 as an example for a service node of a calling party ring signal service as the basic components. Depicted are also the calling party terminal 400 and the called party terminal 450, abbreviated as UE1 and UE2, respectively, with UE standing for user equipment such as e.g. a mobile phone.

A MSC provides signaling and traffic functions. In case of a mobile soft switching system, MSC functions can be divided into MSC Server and Media Gateway (MGw). The CPPRT controlling function can be located together with a Gateway MSC (GMSC) function for better handling of interaction with other call-related features. Optionally it can be implemented in a terminating MSC 440 where the called party registers in. If the call is an inter-MSC call there can be more than one MSC involved in the system, here shown a second MSC (440).

The CPPRT Server 430 stores the CPPRT media data and plays the CPPRT on reception of request from MSC 420.

The called party terminal 450 receives the CPPRT on user plane on reception of notification from network and plays the received ring tone during alerting period.

The HLR 410 as user database stores the service subscription information of the subscriber, i.e. the calling party subscription information to the CPPRT service.

When the UE1 400 registers into the network, for example, at MSC1 420 as shown in FIG. 4, HLR 410 sends to MSC1 420 the subscriber data of UE1 400 including CPPRT subscription information by Insert Subscriber Data procedure as shown in step 41.

When UE1 400 makes a call attempt to UE2 450, the call setup follows the normal call processing procedure until MSC1 420 receives the confirmation message that the called party, i.e. UE2 450, is reached and alerted as shown in step 42. The confirmation message here might be, for example, the Address Complete Message from MSC2 440 if the call is an inter-MSC call. On the reception of that confirmation message, MSC1 420 preferably checks if the calling party, i.e. UE1 400, has a subscription to the CPPRT service.

If the calling party has a subscription to the CPPRT service, in addition to the normal processing procedures to the calling party, MSC1 420 will request CPPRT server 430 to play the ring tone in step 43. The request preferably includes the identity of the calling party, i.e. an identity of the subscriber operating UE1 400, so that the CPPRT server 430 can identify the ring tone selected by the calling party. The interface between MSC1 420 and CPPRT server 430 can be, for example, ISUP or BICC signaling. The CPPRT request may be implemented by an "Initial Address Message" (IAM) for example.

After the payload traffic path is established successfully between CPPRT server 430 and MSC1 420, the CPPRT server 430 sends in a CPPRT response a confirmation message to MSC1 420 and starts to play the ring tone in step 44. The confirmation message may be implemented by an "Address Complete Message" (ACM) for example.

On reception of the confirmation from CPPRT server 430, MSC1 420 separates the payload traffic path between the calling party terminal 400 and terminating node MSC2 440 in step 45. If there is no PRBT service triggered, the MSC1 420 plays the normal ring back tone to the calling party in step 45. On the other side, MSC1 420 connects in step 45 the payload traffic path from CPPRT server 430 to the terminating node, for example, MSC2 440. At the same time in step 45 MSC1 420 informs the terminating node 440 that there is in-band information included in the payload path. The message may be for example a "Call Progress" (CPG) message.

According to step 46, as the terminating node, MSC2 440 informs the called party terminal 450 to attach to the user plane to receive the ring tone from the network, by for example sending a DTAP "Progress" message from MSC 440 to UE2 450. As an alternative to DTAP message, a "Facility" message including an SS Code (Supplementary Server Code) specific for CPPRT to notify the called party may be used. In conjunction with or after the notification message, UE2 450 receives the ring tone played by the CPPRT server 430 and relayed by the MSC1 410 via MSC 2 440 and outputs it to the called party user informing the called party user about the incoming call. In other words, play out of the ring signal by the CPPRT server 430 is triggered at step 44 while the called party terminal 450 receives the played ring signal for output with step 46.

According to step 47, when the MSC1 420 as originating node receives the answer message from the terminating side or the called party terminal 450, or other Call Progress messages indicating that there is in-band information available from terminating side, MSC1 420 cross connects the payload traffic path between the calling party and the terminating side. Then the call will be processed with generic call procedures for the call between the calling party terminal 400 and the called party terminal 450.

After reception of the answer message, or as depicted after the call establishment, MSC1 420 releases the connection to the CPPRT server and other resource related to CPPRT service for this particular call.

For an intra-MSC, i.e. the calling party and the called party register in the same MSC, the MSC1 420 and MSC2 440 are the same node in the network.

In a typical configuration of a communication network and its involved devices, the called party terminal 450 starts to play its default ring tone when the alert message is received in step 42. Typically, the time difference between the alert in step 42 and the notification in step 46 is so short that the default ring tone is immediately replaced by the ring tone specified by the calling party via the CPPRT service, i.e. the user does typically not perceive any switch between ring tones.

However, there might be situations or network configurations where the time difference is prolonged and the switch may become recognizable which is undesired from a user perspective.

Figure 5:
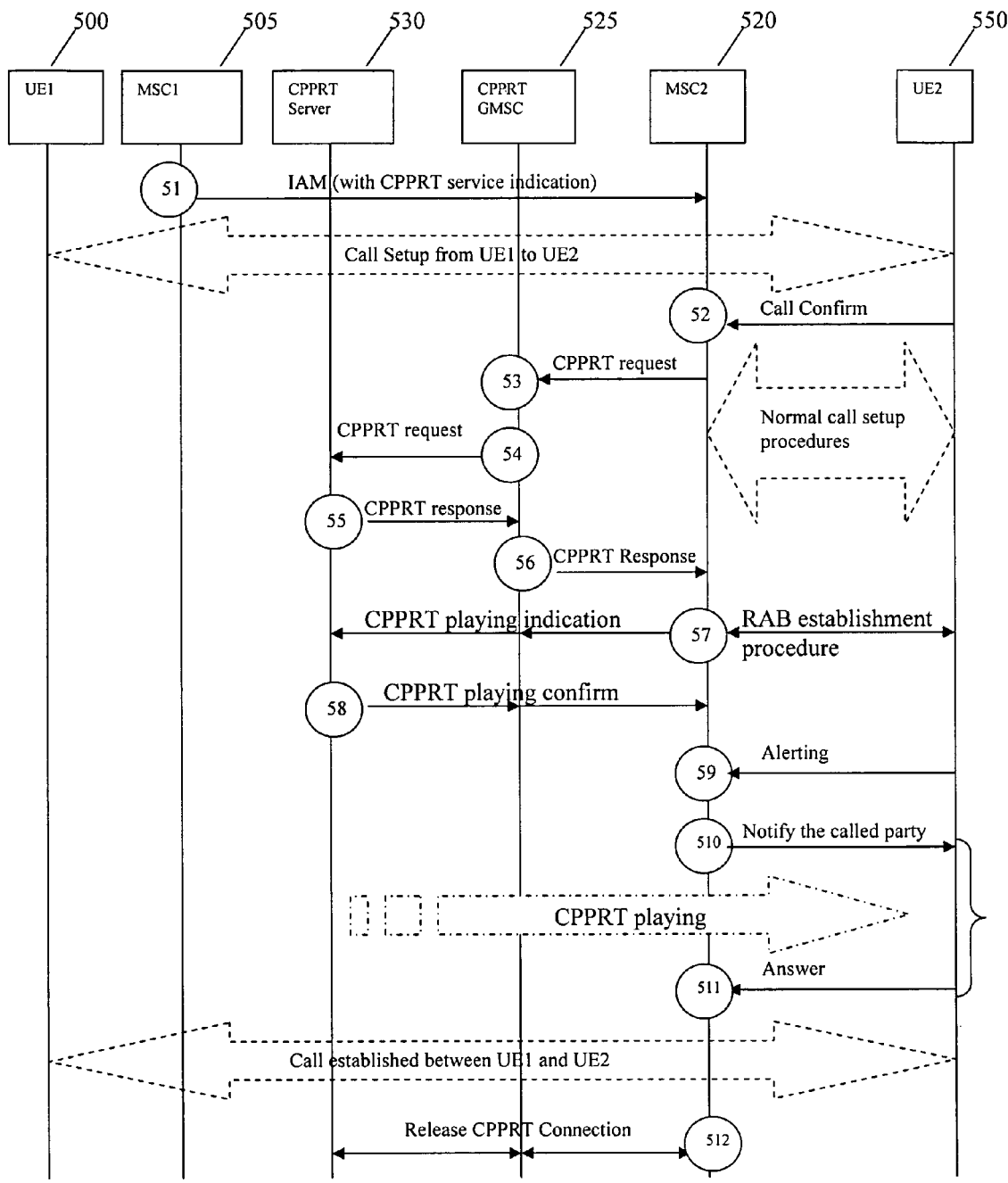
FIG. 5 shows a second schematic signaling diagram in a communication network implementing a calling party ring signal service.

FIG. 5 depicts a signaling diagram wherein the time difference between the alerting causing the default ring tone to be activated and the playing of the ring tone specified by the calling party is minimized.

The communication network of FIG. 5 also employs a HLR providing the same functionality and interactions as HLR 410 in FIG. 4 (HLR not shown in FIG. 5).

The originating side, i.e. MSC1 505 informs the terminating node, i.e. MSC2 520, about the CPPRT service of the calling party operating calling party terminal UE1 500, which can be done using an optional parameter in "IAM" message from originating node MSC1 505 to terminating node MSC 2 520 as shown in step 51. The optional parameter can be for example a "Service Activation" parameter recognized by both the originating and terminating side. The CPPRT service availability between different operators' network thus may depend on the their agreement In the example of FIG. 5, the terminating MSC2 520 controls the CPPRT procedure. After MSC2 520 receives the Call Confirm message from the called party terminal UE 550, MSC2 520 starts CPPRT request to CPPRT server 530. Alternatively MSC2 520 starts a CPPRT request to CPPRT server 530 after the paging response (not shown in FIG. 5) is received from the called party terminal UE 550 which is another example for improving the time alignment for a better perception of the service Since the CPPRT connection establishment is processed in parallel with other call setup procedures such as bearer setup to Radio Access Network (RAN) side, the connections to both sides can be established without any remarkable time difference (msec). If a more accurate time alignment is desired, the terminating MSC2 520 may be adapted to hold the last step of Radio Access Bearer (RAB) assignment procedures to Radio Access Network for while.

Usually, the called party terminal 550 starts playing its own alerting tone, also known as default ring signal, when sending an "Alerting" message to the network. On reception of Alerting message from UE2 550 in step 59, the terminating MSC2 520 then can send CPPRT notification message toward the called party immediately. So the time difference between alerting on the called party terminal and CPPRT playing on the called party terminal will be very short and the switch between the two ring tones, i.e. default ring signal to ring signal sent specified by the calling party should not be perceivable to the called party terminal 550 user.

CPPRT GMSC 525 is used to handle the CPPRT request from terminating side. If the calling party and the called party belong to the same network, the CPPRT GMSC 525 is be typically combined together with MSC2 520 in one physical node.

The individual steps of the signaling diagram of FIG. 5 are described in more detail below:

Step 51: The originating side MSC1 505 informs the terminating node MSC2 520 about the CPPRT service of the calling party by e.g. including an optional parameter, for example "Service Activation" or "Generic notification" with specified feature code, in the IAM message.

Step 52: The terminating MSC2 520 then controls the CPPRT procedure. After MSC2 520 receives the Call Confirm from the called party, it starts CPPRT request to CPPRT server 530 in parallel with normal—known—call setup procedures as shown in steps 53 and 54 (via CPPRT GMSC 525). The request message can be for example, an IAM message. To differentiate this CPPRT request from other IAM messages in normal call processing procedures, the following can be used to indicate the CPPRT service:

- Using a specific number prefix together with calling party UE1's 500 number as part of the called number in the request. This approach can be typically applied within one PLMN network, i.e. MSC2 520 and the CPPRT server 530 belong to the same network, in which case the CPPRT server 530 can be identified by the combination of CPRRT prefix and UE1's number directly. The calling party UE1's 500 number may be used to identify the subscription to the service at any of the nodes involved. The approach of using a specific number prefix together with the calling party UE1's 500 number as part of called number in the request can be used between different networks if proper number and routing analysis is applied.
- Using a specific number as called party number in the request while using the UE1's 500 number as the calling party number. Each network can assign from its own number series one service number to be used as the called party number in CPPRT request from other networks.

The two bullets above further concern routing of the CPPRT request to the appropriate CPPRT server in case multiple CPPRT servers exist. Because the controlling MSC (MSC2 520 in FIG. 5) may not configure all CPPRT server information, the routing of the CPPRT request to the appropriate CPPRT server (CPPRT server 530 in FIG. 5) relies on the transit node(s) (CPPRT GMSC 525 in FIG. 5), which can analyze the included calling party number for the routing. Furthermore, the CPPRT server can identify from the calling party UE1's 500 number a ring signal specified by the calling party.

The CPPRT GMSC 525 analyzes the request received from MSC2 520 in step 53 and then requests in step 54 the corresponding CPPRT server 530 to play the CPPRT specified by calling terminal UE1 500.

Step 55: The CPPRT server 530 can start playing the ring tone already at this stage similar as in FIG. 4, or as an alternative option in order to minimize any time difference between the alerting message inducing the default ring tone and the outputting of the specified ring tone as explained before, the CPPRT server 530 can wait until a further indication is received before playing the ring tone as described for steps 57 and 58. For the alternative, CPPRT server 530 sends a CPPRT response message to the CPPRT GMSC 525 indicating CPPRT server's 530 readiness to play the specified CPPRT.

Step 56: CPPRT GMSC 525 responds to the terminating MSC2 520 that the CPPRT server is ready.

Step 57: This step and step 58 are optional steps to achieve better alignment of CPPRT playing and the called party's terminal UE2 550 default alerting. The CPPRT server 530 is waiting for a further indication to start playing the specified ring tone. MSC2 520 holds the initiation of the RAB assignment procedure until the CPPRT response indicating a readiness for play-out of the CPPRT by the CPPRT server 530 in step 56 is received, and in parallel of the RAB establishment procedure to Radio Access Network (RAN) MSC2 520 sends an indication message to the CPPRT server 530 via GMSC 525 to notify the CPPRT server to start playing the selected ring tone. The indication message to the CPPRT server 530 can be a CPG message for example. To avoid an impact from any exceptional scenarios in the procedure of the CPPRT request sent to the CPPRT server 530, such as no CPPRT response received from CPPRT server 530 for any reason, MSC2 520 may start a timer when RAB assignment procedure is held and will continue generic call processing procedure if the timer expires. The timer can be deactivated when the procedure to RAN side is continued.

Step 58: On reception of the CPPRT playing indication from MSC2 520, or in other words after the reception of an indication for requesting the service node to immediate play-out the CPPRT, the CPPRT server 530 starts playing the selected ring tone and sends a response message "CPPRT playing confirm" to MSC2 520 (via GMSC 525) to confirm that CPPRT specified by the calling party is playing. The response message can be also a CPG message.

Step 59: MSC2 520 immediately connects the payload traffic path from CPPRT server 530 via CPPRT GMSC 525 with the payload traffic path to the called party terminal 550 after the CPPRT response from CPPRT server as described in step 55 and step 58, and the Alerting message from the called party terminal UE2 550 are both received.

Step 510: The terminating MSC2 520 notifies the called party terminal UE2 550 to attach the user plane after the payload traffic paths are cross connected between CPPRT server and the called party terminal in step 59. On reception of the notification message, the called party terminal 550 starts receiving the ring tone from network and plays the CPPRT. Hence, as illustrated in FIG. 5, UE2 550 receives the ring tone played by the CPPRT server 530 and relayed by MSC2 520 via GMSC 525 and outputs it to the called party user informing the called party user about the incoming call.

Step 511: When the terminating MSC2 520 receives the answer message from the terminating side or the called party, or other call status changes, MSC2 520 should cross connect the payload traffic path between the calling party terminal 500 and the called party terminal 550 or other media devices such announcement devices etc. Then the call will be processed with generic call procedures for the call between the calling party terminal 500 and the called party terminal 550.

Step 512: After reception of the answer message, or as depicted, MSC2 520 then releases the connection to the CPPRT server 530 and other resource related to CPPRT service for this particular call.

It is now illustrated that for a call from a calling party to a called party both the calling party ring signal service and a personalized ring back signal service can be performed giving the calling party the possibility to specify a ring signal for the called party as well as a ring back signal for his/her own (it is referred in the further description to a ring back "tone" and personalized ring back "tone" (PRBT) service). A PRBT is an example of a more generalized service using ring back signals with a ring back tone being an example for a ring back signal. A ring back signal can be any kind of signal to inform the calling party about the call, e.g. audio, video, multimedia, optical, vibration signal etc. that can be output at the calling party terminal as ring back signal specified by the calling party. For convenience and to better differentiate from the new ring signal service, the term ring back tone and PRBT will be used further on without meant to be limited to "tones".

In case that the called party has a subscription to a PRBT service while the calling party has a subscription to a CPPRT service, the originating MSC should be informed by the HLR that the called party has PRBT service in the Send Routing Information (SRI) response message during interrogation procedure if the originating node performs the GMSC function for this call, and if the calling party has a subscription to a PRBT service, the serving MSC of the calling party should be informed by the HLR in Insert Subscriber Data message when the calling party registers in the MSC. Then at the step 45 in FIG. 4, MSC1 420 as originating node can connect the called party's PRBT traffic to the calling party, and connect the calling party's CPPRT to the called party.

Figure 6:
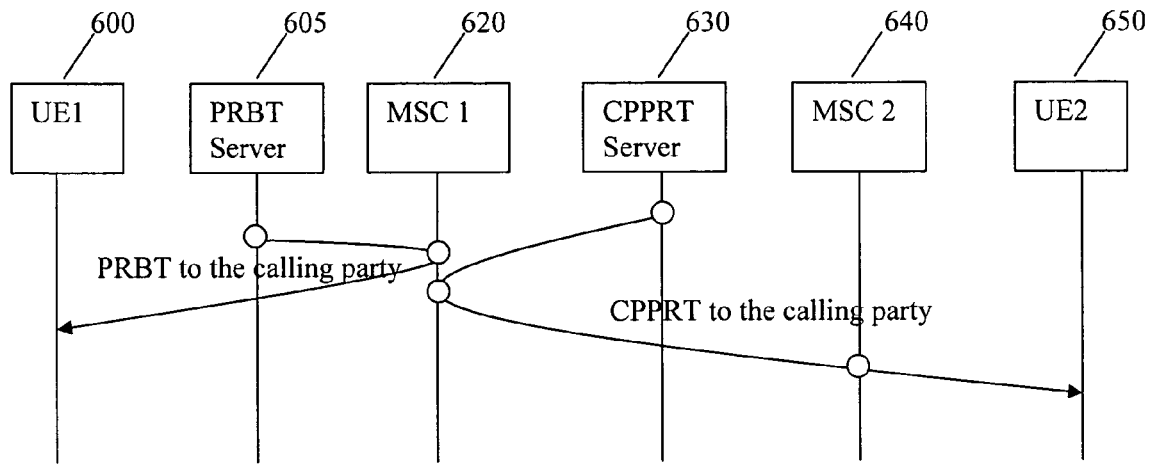
FIG. 6 shows a schematic illustration of paths in a communication network with calling party ring signal service and PRBT service.

Similar to FIG. 4, FIG. 6 shows a calling party terminal UE1 600, a called party terminal UE2 650, a first (controlling) MSC1 620, an (optional) second MSC2 640, and a CPPRT server 630. In addition, PRBT server 605 is depicted. FIG. 6 further shows the traffic path connections for co-existing PRBT and CPPRT services as examples for communication network paths.

If the originating node, for example the MSC1 420 in FIG. 4, does not perform the GMSC function for the call, i.e. called party interrogation procedure is not performed by itself, the originating node follows normal call processing without triggering the CPPRT procedure. Instead the CPPRT control procedures are moved to the called party GMSC that is different from the originating MSC in this call scenario. The service availability between different operators' network can thus depend on the agreement and GMSC functionality in called party side.

Figure 7:
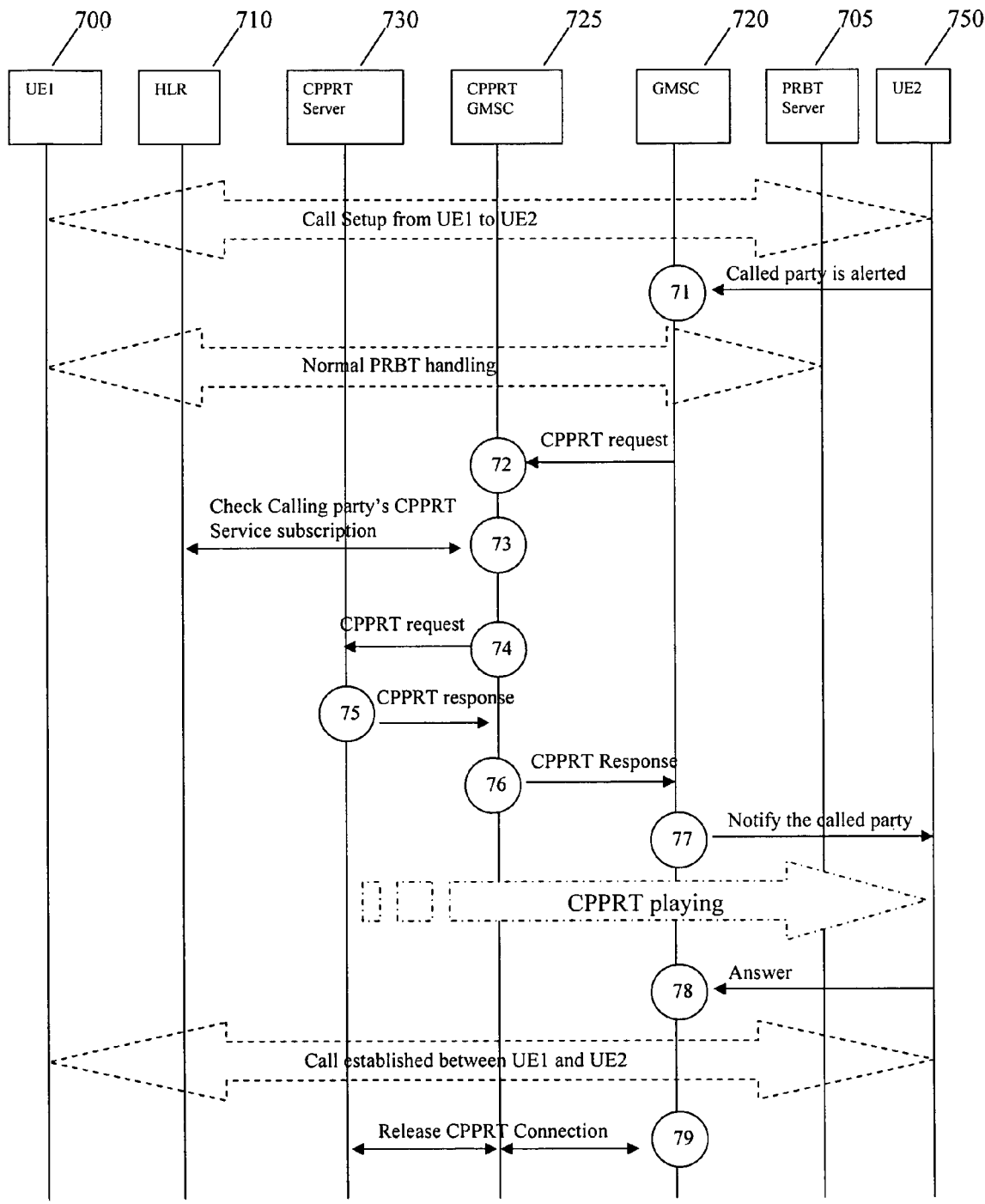
FIG. 7 shows a schematic signaling diagram in a communication network implementing calling party ring signal service and PRBT service.

FIG. 7 shows an example of a signaling diagram for parallel PRBT and CPPRT handling in a communication network comprising the following components:

The GMSC 720 performs the called party interrogation procedure and is in this example the controlling node of CPPRT procedure. The GMSC 720 might be located together with the terminating MSC (such as MSC2 440 of FIG. 4, not depicted here for simplicity) wherein the UE2 750 is registered. The CPPRT GMSC 725 refers to a MSC that can perform interrogation procedure for the calling party to check the CPPRT service subscription information and is able to identify the CPPRT server 730 by analyzing the identifier of the calling party UE1 700. It might be combined together with the GMSC 720. The CPPRT Server 730 refers to a node that stores the CPPRT media data and plays the CPPRT upon reception of a request from an MSC, in this example from GMSC 720 via CPPRT GMSC 725. The PRBT server 705 provides the well-known PRBT functions. Further shown are the calling party terminal UE1 700, the called party terminal UE 750, and the HLR 710 storing the CPPRT subscription information comprising subscription information related to the CPPRT service of the calling party. The subscription information can be provided to the GMSC 720 by the originating MSC e.g. with an IAM message as described in conjunction with FIG. 5, which will not be illustrated further, or alternatively as illustrated below in step 73 the CPPRT GMSC 725 can verify the CPPRT service subscription status of the calling party by interrogation procedure.

Step 71: The call from UE1 700 to UE2 750 is processed as normal procedures until the GMSC 720 detects that the called party terminal UE 750 is alerted. According to the called party's service subscription, the GMSC 720 can perform PRBT procedure as usual.

Step 72: If the GMSC 720 can not perform interrogation for the calling party, it sends CPPRT request to the CPPRT GMSC 725. The request message can be for example, an IAM message. To differentiate this CPPRT request from any normal call request, the following can be used to indicate the CPPRT service:

Using specific number prefix together with UE1's number as the called number in the request.

Using a specific number as called party number in the request while using the UE1's number as the calling party number.

as explained in detail in conjunction with FIG. 5.

Step 73: When the CPPRT GMSC 725 receives the CPPRT request, it can perform HLR 710 interrogation to check if the UE1 700 has the CPPRT service subscription. If the CPPRT service is not subscribed by UE1 700, the CPPRT procedure is released and the call is continued as usual. In case the calling party has a valid subscription, the method proceeds to step 74. This step is not required if the CPPRT subscription information of the calling party has been provided to the GMSC 720 by the originating MSC e.g. with an IAM message as described in conjunction with FIG. 5

Step 74: Because of the valid subscription to the CPPRT service, CPPRT GMSC 725 then requests CPPRT server 730 to play the CPPRT selected by the calling party.

Step 75: CPPRT server 730 plays the selected ring tone media and respond to CPPRT GMSC 720.

Step 76: CPPRT GMSC 725 respond to GMSC 720 that the CPPRT is playing.

Step 77: GMSC 720 connects the CPPRT traffic path from CPPRT server 730 via CPPRT GMSC 725 with the traffic path to the called party terminal 750 and notifies the called party terminal 750 to attach the user plane. The notification to the called party is the same as in the procedure of step 45 and step 46 described in conjunction with FIG. 4 and will not be further elaborated here. When the traffic path from the CPPRT server 730 via CPPRT GMSC 725 and GMSC 720 to the called party terminal UE2 750 is established, the played CPPRT is output at the calling party terminal 750.

Step 78: When the GMSC 720 receives the answer message from the terminating side or the called party, or other Call Progress messages indicating that there is in-band information available from terminating side, the GMSC 720 cross connects the payload traffic path between the originating side, i.e. the calling party terminal 700 and the terminating side, i.e. the called party terminal 750. Then the call will be processed with generic call procedures for the call between the calling party terminal 700 and the called party terminal 750.

Step 79: After reception of the answer message, or as depicted, the GMSC 720 then releases the connection to the CPPRT server 730 and other resource related to CPPRT service.

The principle of separation of traffic paths for the CPPRT and the PRBT service can be applied also to other network set-ups and other implementations, e.g. the one of FIG. 5 with a PRBT service traffic path from a PRBT server (not shown in FIG. 5) to the GMSC that might be the MSC1 505 or MSC2 520 in FIG. 5 or another standalone GMSC node not shown in FIG. 5, and then to the calling party terminal 500, while the CPPRT service uses the traffic path from CPPRT server 530 to terminating MSC 520 via CPPRT GMSC 525 and finally to the called party terminal 550.

All embodiments according to FIG. 4-7 have in common that a traffic path (which is an example for a communication network path) used for call set-up procedures is also used for the sending of the ring signal from the controlling communication network node to the called party terminal. The re-use of the path for the call attempt procedure to the called party terminal for the sending of the ring signal is preferred, because the communication network node is thus provided with control about the two processes (call set-up and calling party ring signal service) that preferably needs to be time-aligned for minimizing delays. The re-use of the same path can further beneficial as it eliminates communication overhead and processing effort for an additional path.

The called party, for whatever reasons, may prefer to listen to his own ring tones stored in his terminal. To support this possibility, a further subscription option for the end user as the called party is provided in which the called party can set the preference on receiving CPPRT. The CPPRT controlling node, for example, MSC1 420 in FIG. 4 if it acts GMSC for the call, or the GMSC 720 in FIG. 7, should be informed by HLR 410 or HLR 710 during interrogation procedure if the called party has the preference of not receiving the CPPRT. Then the call setup may be handled as usual without the CPPRT service triggered and executed.

Figure 8:
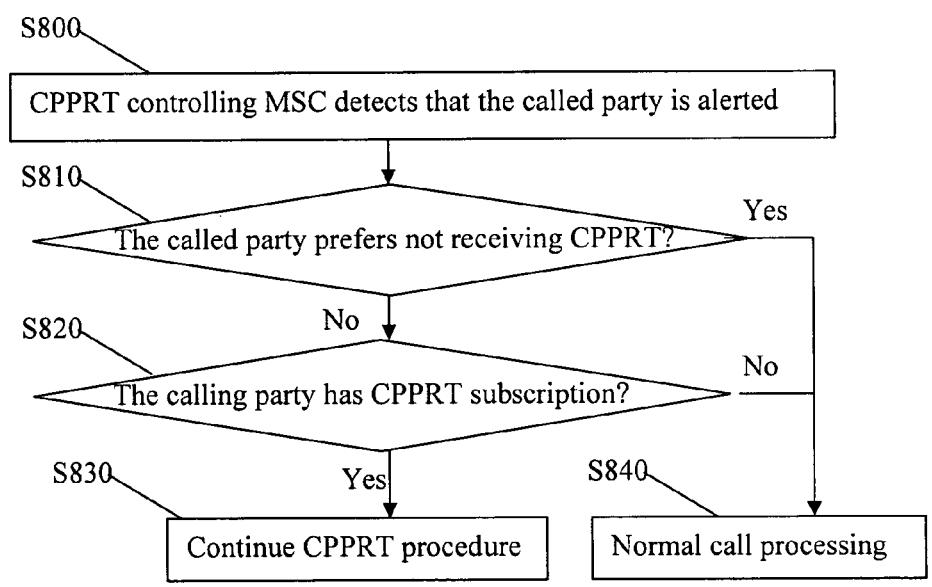
FIG. 8 shows a flow chart of steps for a subscription and preference handling example.

FIG. 8 shows an example of steps of a procedure how called party's preference can be handled in the system. The CPPRT controlling MSC refers to the MSC that controls the CPPRT procedure, as the MSC1 420 in FIG. 4 or the GMSC 720 in FIG. 7. In the system shown in FIG. 5, the terminating node MSC2 520 that acts as the CPPRT controlling MSC (typically) receives the preference information of the called party from HLR (not shown in FIG. 5) during the registration procedure of the called party in MSC2 520.

The CPPRT controlling MSC detects S800 that the called party is alerted and checks in step S810 any preference information relating to the called party. If the preference information indicates that the called party does not wish to receive CPPRT ("Yes"), then the method proceeds to step 840 for normal call processing with default ring tone. If the preference information indicates that the called party prefers to receive CPPRT ("No"), the method proceeds to step S820 wherein it is checked whether the calling party has a CPPRT subscription. If yes, the CPPRT procedure can be further executed as indicated by step S830, otherwise the normal call processing with default ring tone is applied. The sequence of steps 810 and 820 may be exchanged such that first it is checked whether the calling party has a subscription to CPPRT at all before checking any preference information relating to the called party.

According to an embodiment of the called party's CPPRT preference, a method is provided for the called party to define a black or white list. The subscriber user having the role of the called party can define a CPPRT black list and the system can suppress any CPPRT from a calling party included in the black list. Another alternative is a CPPRT white list defined by the subscriber user having the role of the called party. Then, the system is configured to only allow a CPPRT from a calling party that is included in the white list.

To support the called party CPPRT preference based on black/white list, the system provides the following functions:

The HLR in the CPPRT system stores the CPPRT black and/or white list for each subscriber if the subscriber has this service.

In the system shown in FIG. 4 or 7, HLR 410 or HLR 710 sends to the CPPRT control node, i.e. MSC1 420 in FIG. 4 and GMSC 720 in FIG. 7, the CPPRT black and/or white list of the called party during interrogation procedure. Then the CPPRT control node checks if the calling party number is included in the black list and/or the white list, and only trigger the CPPRT procedure if the calling party number is allowed to play CPPRT according to the black and/or white list of the called party.

In the system shown in FIG. 5, the HLR (not shown) sends the CPPRT black and/or white list of the called party to the serving MSC, i.e. MSC2 520. On reception of terminating call request, the MSC2 520 checks if the calling party number is included in the CPPRT black and/or white list before triggering CPPRT procedure to the CPPRT server.

Figure 12:
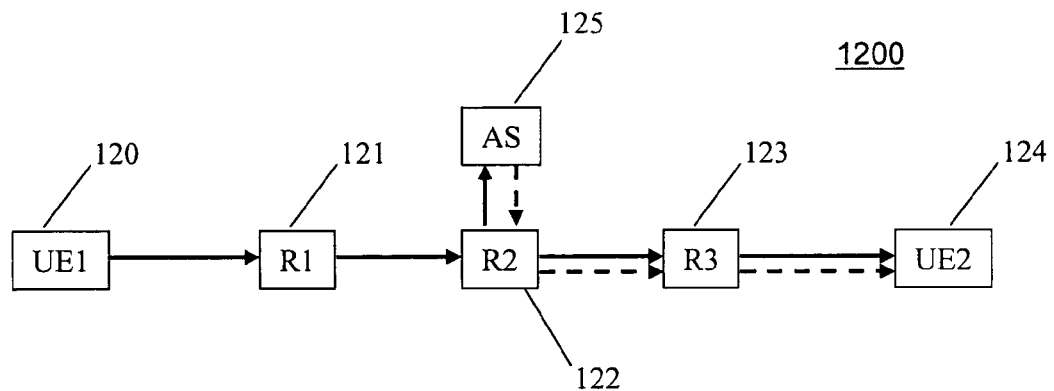
FIG. 12 shows an embodiment of a communication network implementing a calling party ring signal service.

FIG. 12 depicts a communication network 1200 comprising a calling party terminal 120, a called party terminal 124, routers 121, 122, 123, and an application server 125. Router 122 and application server 125 comprise the functionality of a communication network node and service node, respectively, according to the invention. For simplicity of illustration, it is assumed that the calling party terminal 120 comprises in addition the functionality of a terminal of the calling party for obtaining and sending instructions to specify a ring signal by the calling party, however, the terminal of the calling party and the calling party terminal 120 can be separate devices (not shown in FIG. 12).

A routing path (which is another example for a communication network path) for routing packets from the calling party terminal 120 via routers 121,122,123 to the called party terminal 124 is illustrated by continuous-line arrows. For providing a calling party specified ring signal to the called party terminal 124 to alert the called party user about the incoming call, router 122 requests (continuous arrow from router 122 to application server 125) a ring signal at the application server 125 that hosts the calling party ring signal service for the calling party. The ring signal is routed from the application server 125 to router 122. Router 122 sends packets comprising the ring signal via the same routing path as packets used for call attempt to the called party terminal 124, i.e. via router 123 according to the example of FIG. 12. The use of the same path both for call attempt related as well as ring signal data is illustrated by parallel arrows between router 122 via router 123 to called party terminal 124 with continuous-line arrows for call attempt related data and dashed lines for ring signal data. Same path routing can be of advantage as the same routing address scheme and same resources for both, call-set-up as well as ring signal provisioning, can be used, e.g. the router 122 may address packets associated with the call set-up and the ring signal to the same IP-address.

Figure 13:
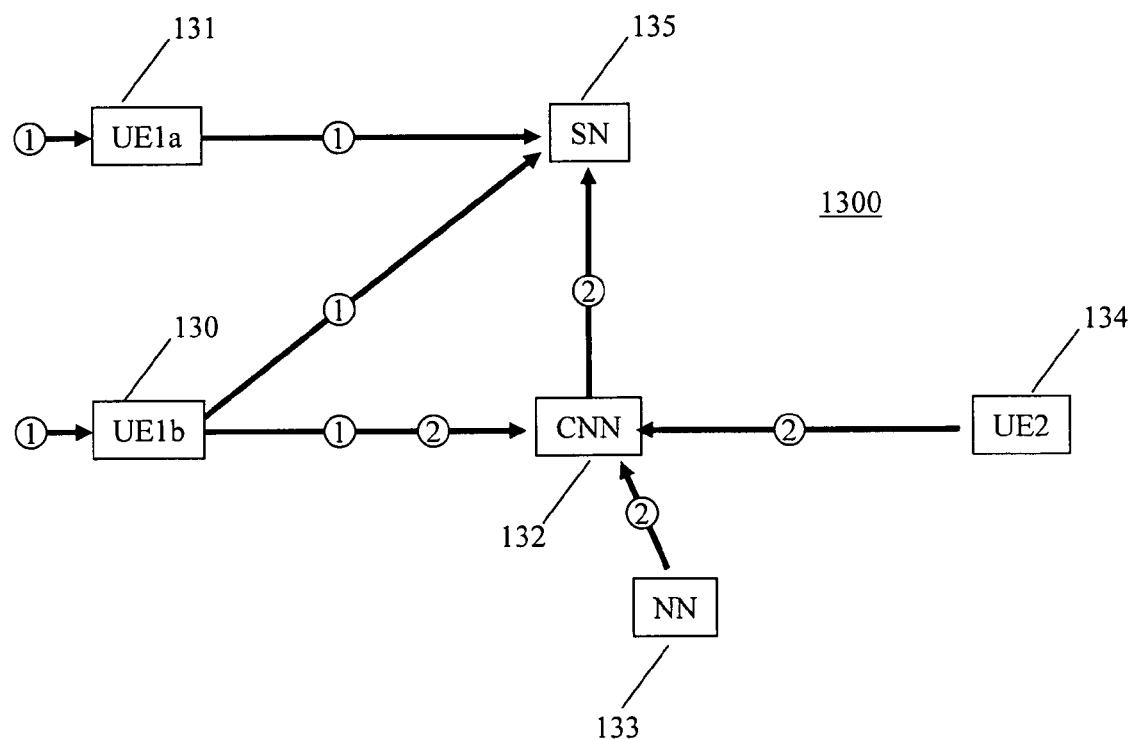
FIG. 13 shows an illustration of a communication network and possible flows of instructions and information for specifying a ring signal at a service node of a calling party ring signal service.

FIG. 13 illustrates a communication network 1300 and possible flows of instructions (1) and information (2) for specifying a ring signal at a service node 135 of a calling party ring signal service for a call from a calling party terminal 130 to a called party terminal 134 via a communication network node 132. Information and/or instructions for specifying a ring signal can relate to at least one of a particular ring signal specified by the calling party for the current or a future call, to the current or a future calling party, to a type of the calling party or a future calling party, to the current or a future called party, to a type of the current or a future called party, to a characteristic such as a type or a ring signal related processing and output capability of the current or a future called party terminal, and timing information relating to the current or a future call as examples providing enhanced possibilities for the specification and obtaining of the ring signal.

The calling party user may enter one or more instruction(s) for specifying a ring signal into a terminal 131 for the calling party. The entered instruction(s) are then forwarded to the service node 135 for specifying a ring signal by the calling party, e.g. in form of a ring signal profile as described in more detail above.

Alternatively or in addition, the calling party user may enter one or more instructions into the calling party terminal 130 for specifying a ring signal to be used for alerting the called party regarding a call from the calling party. The calling party user may enter one or more instructions into the calling party terminal 130 with the intention to specify the ring signal at the service node 135 for a future call. In this case, the calling party terminal 130 may be adapted to send the entered instruction(s) to the service node 135 or via the communication network node 132 to the service node 135. The communication network node 132 can pass on the instruction(s) to the service node 135 in form of information for specifying the ring signal. According to another example, the calling party user may enter one or more instructions into the calling party terminal 130 to specify a ring signal for a call that is to be made now to a calling party, i.e. in a call-by-call fashion for a current call. The calling party user may dial the called party number as usual and may enter in addition one or more instructions, e.g. an identifier of a particular ring signal, into the calling party terminal 130. The entered instruction(s) are sent from the calling party terminal 130 to the service node 132 for specifying the ring signal by the calling party by sending the instruction(s) first to the communication network node 132 in conjunction with the call attempt (dialing of calling party number and usual call processing). The communication network node 132 receiving the instruction(s) can pass them on to the service node 135 in form of information for specifying the ring signal for the current call.

The information that is sent from the communication network node 132 to the service node 135 may be a copy of the received instruction(s) or an indication thereof or derived from the received instructions possibly considering further information for specifying the ring signal obtained from further entities in the network such as a further communication network node 133, from the called party terminal 134, and/or from entities (not shown) along the communication network path from the calling party terminal 130 or from the called party terminal 134 to the communication network node 132. The further information may relate to capabilities of the called party terminal 134, to bearer capabilities, etc. for improved specification of the ring signal that is actually obtained for a particular call.

Specification of a ring signal by information and instructions can be used to set the ring signal for a calling party and to set further associations to further information, e.g. in form of a ring signal profile. The specification of a ring signal can further comprise the process of identification of an appropriate ring signal at the service node for the obtaining.

Figure 9:
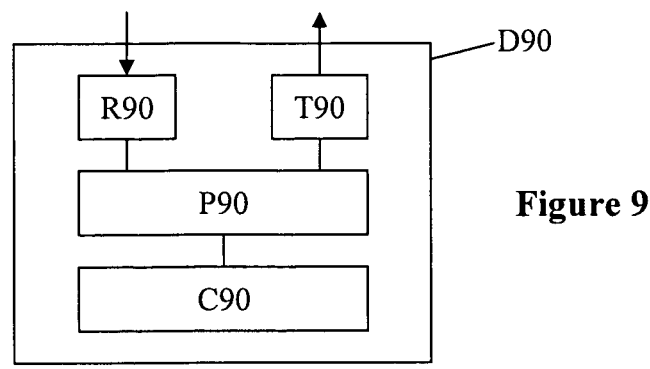
FIG. 9 shows a schematic illustration of a communication network node.
Figure 10:
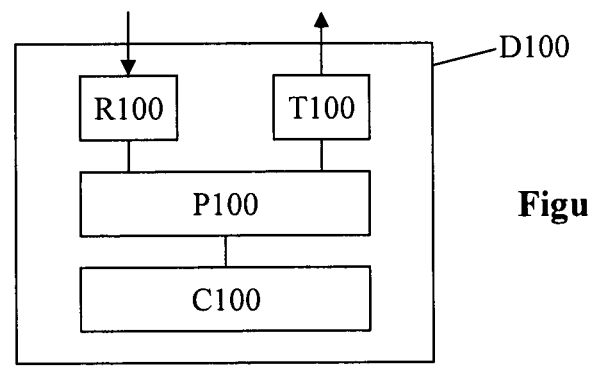
FIG. 10 shows a schematic illustration of a service node of a calling party ring signal service.
Figure 11:
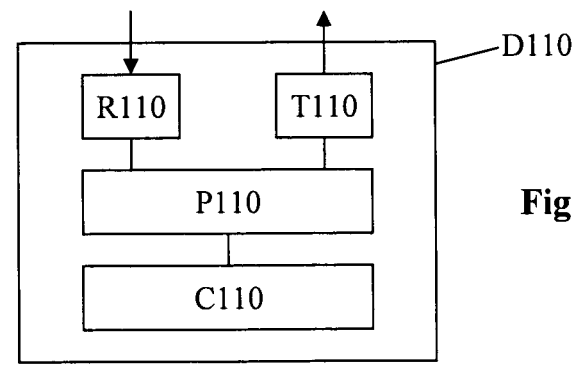
FIG. 11 shows a schematic illustration of a terminal for a calling party.

The invention is furthermore embodied in devices which are described in more detail below in relation to FIG. 9-11.

An embodiment of a communication network node D90 for providing a ring signal to a called party terminal for a call from a calling party terminal to the called party terminal for alerting the called party regarding the call from the calling party is described in the following:

The communication network node D90 comprises a receiving unit R90, a transmission unit T90, a processing unit P90, and a storage unit C90. The receiving unit R90 is adapted to receive an indication of an attempt for the call. The transmission unit T90 is adapted to send a ring signal specified by the calling party at a service node of a calling party ring signal service to the called party terminal for alerting the called party regarding the call from the calling party.

The communication network node D90 with its individual units R90, T90, P90, C90 may be adapted to perform any of the steps of the methods described herein as far as related to a communication network node, wherein the receiving unit R90 is adapted to receive data, the transmission unit T90 is adapted to send data, the processing unit P90 is adapted to process data, e.g. to store data at and/or retrieve data from the storage unit C90 and/or to initiate a sending of data via the transmission unit T90.

An embodiment of a service node D100 of a calling party ring signal service for providing a ring signal to a called party terminal for a call from a calling party terminal to the called party terminal for alerting the called party regarding the call from the calling party is described in the following:

The service node D100 comprises a receiving unit R100, a transmission unit T100, a processing unit P100, and a storage unit C100. The receiving unit R100 is adapted to receive a request from a communication network node for a ring signal for alerting the called party regarding the call from the calling party. The processing unit P100 is adapted to obtain a ring signal specified by the calling party at the calling party ring signal service, e.g. from storage unit C100. The transmission unit T100 is adapted to send the ring signal to the communication network node.

The service node D100 with its individual units R100, T100, P100, C100 may be adapted to perform any of the steps of the methods described herein as far as related to a service node, wherein the receiving unit R100 is adapted to receive data, the transmission unit T100 is adapted to send data, the processing unit P100 is adapted to process data, e.g. to store data at and/or retrieve data from the storage unit C100 and/or to initiate a sending of data via the transmission unit T100.

An embodiment of a terminal D110 for a calling party for providing a ring signal to a called party terminal for a call from a calling party terminal to the called party terminal for alerting the called party regarding the call from the calling party is described in the following:

The terminal D110 comprises a receiving unit R110, e.g. an input unit such as a keyboard and/or microphone, a transmission unit T110, a processing unit P110, and a storage unit C110. The receiving unit R110 is adapted to receive one or more instructions for specifying a ring signal to be used for alerting the called party regarding a call from the calling party for the obtaining of the one or more instructions. Alternatively, or in addition, one or more instructions for specifying a ring signal to be used for alerting the called party regarding a call from the calling party may be obtained from the storage unit C110. The transmission unit T110 is adapted to send the one or more instructions to a service node of a calling party ring signal service for specifying the ring signal by the calling party. The terminal D110 with its individual units R110, T110, P110, C110 may be adapted to perform any of the steps of the methods described herein as far as related to a terminal for a calling party, wherein the receiving unit R110 is adapted to receive input from the calling party user, the transmission unit T110 is adapted to send data, the processing unit P110 is adapted to process data, e.g. to store data at and/or retrieve data from the storage unit C110 and/or to initiate a sending of data via the transmission unit T110.

Each unit R90-110, T90-110, P90-110, C90-110 may consist of one or more sub-units of the same or different technology. For example, receiving unit R110 may comprise a keyboard for inputting instructions as well a wireless receiver needed in addition to a wireless transmitter (as part of the transmission unit T110) for exchanging data in a wireless communication network.

The present invention also concerns computer programs comprising portions of software codes in order to implement the methods as described above when operated at a communication network node, a service node of a calling party ring signal service, and a terminal for a calling party. A computer program can be stored on a computer readable medium. A computer-readable medium can be a permanent or rewritable memory within a respective device or located externally. A computer program can be also transferred to a respective device for example via a cable or a wireless link as a sequence of signals.

The invention as described herein is based on a calling party user specifying a ring signal at a service node of a calling party ring signal service. At call attempt, a communication network node sends the specified ring signal to the called party terminal for alerting the called party regarding the call from the calling party. The communication network node is provided with information based on which the communication network node can initiate the sending of the ring signal. Examples for such information are an indication of an attempt for the call, information that the service node is ready to send the ring signal, and/or information that the called party terminal starts or is about to start outputting its default ring signal. Hence, due to this involvement into the call attempt (aka call set-up) procedure, the communication network node can precisely control the timing of the sending of the ring signal in accordance with further processes and messages at call attempt time. Furthermore, the communication network node may be adapted to verify that the ring signal received from the service node is in accordance with the calling party's subscription or with other settings or characteristics. For example, the calling party may have subscribed to a calling party audio ring signal service but the service node sends for any reasons a multimedia ring signal. The communication network node may analyze the received ring signal and take appropriate actions, e.g. to send another request for a ring signal to the service node, to cancel or interrupt the sending (esp. in case of relaying), or to fall-back to a default ring signal which is in accordance with the calling party's subscription etc. The communication network node may intercept or monitor the ring signal for even other purposes, e.g. statistics or legal reasons. Hence, sending a calling party specified ring signal from a communication network node being involved in the call attempt (aka call set-up) procedure clearly enhances the control compared to other solutions wherein the communication network node is not involved in the sending of the ring signal. Furthermore, a called party terminal can receive call attempt related information as well as the ring signal via the same communication network path. Hence, the establishment of multiple connections for transmission of the ring signal and call attempt related information is not needed.

It is therefore of advantage that the communication network node actually sends the ring signal (e.g. in form of a stream of data that when processed and output at the called party terminal alerts the called party) to the called party terminal which is superior in terms of communication network control compared to approaches wherein the called party terminal is referred to a further node to receive the ring signal therefrom.

The general procedures described herein are applicable to all kind of communication networks comprising a communication network node, a service node, and terminal of the calling party which can be the calling party terminal or a separate terminal. The general procedures are suited for providing a ring signal in a mobile circuit-switched network such as a Global System for Mobile Communications (GSM), Code Division Multiple Access (CDMA), Wideband-CDMA (WCDMA), and Time Division-Synchronous Code Division Multiple Access (TD-SCDMA) etc. network but are also suited for any kind of packet-switched network with the nodes and functionalities described. IP-based communications networks, especially when providing same path routing functionally for sending information relating to the call attempt and the ring signal are also well suited.

The invention claimed is:

1. A method implemented by a communication network node for providing a ring signal to a called party terminal, the ring signal alerting a called party associated with the called party terminal about a call from a calling party associated with a calling party terminal, the method comprising:

receiving an indication of an attempt for the call;

in response to the received indication, sending a request for a ring signal to a service node of a calling party ring signal service;

receiving information that the service node is ready to send the ring signal;

deferring initiation of an access to the called party terminal until after reception of the information that the service node is ready to send the ring signal;

after access to the called party is initiated, sending an indication requesting the service node to immediately send the ring signal; and immediately after the reception of the ring signal from the service node, sending the ring signal specified by the calling party at the service node of the calling party ring signal service to the called party terminal for alerting the called party regarding the call from the calling party.

2. The method according to claim 1, wherein the ring signal is played by the service node while the communication network node receives the ring signal, the method further comprising relaying the received played ring signal for the sending of the ring signal to the called party terminal.

3. The method according to claim 1 further comprising at least one of:

sending a notification message to the called party terminal informing the called party terminal about the sending of the ring signal;

sending a message for suppressing a default ring signal at the called party terminal;

executing the sending of the ring signal immediately after reception of information that the called party terminal starts or is about to start outputting its default ring signal;

sending the ring signal via the same communication network path used to send information related to the attempt for the call to the called party terminal;

sending to the service node information for specifying the ring signal for the call that is attempted; and sending to the service node information for specifying the ring signal for a future call.

4. The method according to claim 3, wherein the information for specifying the ring signal is obtained from one or more instructions received from the calling party terminal.

5. The method according to claim 3, wherein the information for specifying the ring signal is obtained from further information suited for specifying the ring signal received from further entities of the communication network.

6. The method according to claim 1, further comprising:

checking if at least one of the calling party and the called party has a subscription to a ring back signal service;

selecting a first communication network path for sending a ring back signal to the calling party terminal, the first communication network path being separate from a second communication network path for the sending of the ring signal to the called party terminal; and sending the ring back signal via the first communication network path to the calling party terminal and sending the ring signal via the second communication network path to the called party terminal.

7. The method according to claim 1, further comprising sending to the service node information for specifying the ring signal for a future call.

8. The method according to claim 1 further comprising checking if the called party is associated with a preference setting regarding the calling party ring signal service.

9. A method implemented by a service node of a calling party ring signal service for providing a ring signal to a called party terminal, the ring signal alerting a called party associated with the called party terminal about a call from a calling party associated with a calling party terminal, the method comprising:

receiving a request from a communication network node for a ring signal for alerting the called party regarding the call from the calling party;

obtaining a ring signal specified by the calling party from the calling party ring signal service;

before access to the called party is initiated by the communication network node, sending information indicating a readiness to send the ring signal;

after access to the called party is initiated by the communication network node, receiving an indication from the communication network node requesting the service node immediately send the ring signal to the communication network node; and sending the ring signal after reception of the indication requesting the service node immediately send the ring signal to the communication network node.

10. The method according to claim 9, wherein the ring signal is played while the sending the ring signal.

11. The method according to claim 9, further comprising:

receiving from the communication network node information specifying the ring signal for the call that is attempted; and obtaining the ring signal based on the received information.

12. The method according to claim 9, further comprising:

receiving at least one of:

information specifying the ring signal for a future call, said information received from the communication network node; and one or more instructions for specifying the ring signal for a future call, the one or more instructions being received from at least one of a terminal for the calling party and the calling party terminal;

recording at least one of the received information and the one or more received instructions; and obtaining the ring signal based on the recording.

13. A communication network node for providing a ring signal to a called party terminal, the ring signal alerting a called party associated with the called party terminal about a call from a calling party associated with a calling party terminal, the communication network node comprising:

a receiving unit configured to receive an indication of an attempt for the call; and a transmission unit, in response to the received indication, configured to:

send a request for a ring signal to a service node of the calling party ring signal service;

receive information that the service node is ready to send the ring signal;

defer initiation of an access to the called party terminal until after reception of the information that the service node is ready to send the ring signal;

after access to the called party is initiated, send an indication for requesting the service node to immediately send the ring signal; and immediately after the reception of the ring signal from the service node, send to the called party terminal the ring signal specified by the calling party at a service node of a calling party ring signal service, for alerting the called party regarding the call from the calling party.

14. A service node of a calling party ring signal service for providing a ring signal to a called party terminal, the ring signal alerting a called party associated with the called party terminal about a call from a calling party associated with a calling party terminal, the service node comprising:
 a receiving unit configured to receive a request from a communication network node for a ring signal for alerting the called party regarding the call from the calling party;
 a processing unit configured to obtain the ring signal specified by the calling party at the calling party ring signal service; and
 a transmission unit configured to:
 before access to the called party is initiated by the communication network node, send information indicating a readiness to send the ring signal, wherein after access to the called party is initiated by the communication network node, the receiving unit is further configured to receive an indication from the communication network node requesting the service node immediately send the ring signal to the communication network node; and
 send the ring signal after reception of the indication for requesting the service node to immediately send the ring signal to the communication network node.

\* \* \* \* \*